United States Patent [19]

Cooper et al.

[11] 4,395,867
[45] Aug. 2, 1983

[54] PEPPER HARVESTING APPARATUS

[76] Inventors: David Cooper, Rte. 3; Roger D. Cooper, Rte. 4, both of Hodgenville, Ky. 42748

[21] Appl. No.: 265,420

[22] Filed: May 19, 1981

[51] Int. Cl.³ ............... A01D 45/00; A01D 46/00; B60P 1/36
[52] U.S. Cl. .................. 56/327 R; 56/328 R; 414/508
[58] Field of Search ............ 56/327 R, 328 R, 36-39, 56/126, 49, 27.5, 16.6, 13.9, 17.2; 414/508; 198/300, 311

[56] References Cited

U.S. PATENT DOCUMENTS

| | | | |
|---|---|---|---|
| 823,034 | 6/1906 | Combee | 414/508 |
| 1,275,781 | 8/1918 | Stark et al. | 414/508 |
| 1,504,846 | 8/1924 | Tarkington | 414/508 |
| 2,395,124 | 2/1946 | Jelderks | 56/327 R |
| 2,786,585 | 3/1957 | Davis et al. | 414/508 |
| 2,788,141 | 4/1957 | Hendrix | 414/508 |
| 3,664,526 | 5/1972 | Dilday | 214/83.1 |
| 3,827,446 | 8/1974 | Honeycutt | 134/63 |
| 4,026,431 | 5/1977 | Long | 214/519 |
| 4,066,176 | 1/1978 | Honeycutt | 214/43 |

OTHER PUBLICATIONS

Make-it-Easy-Harvester, two page brochure put out by D. G. Walker.

Primary Examiner—Gene Mancene
Assistant Examiner—John Weiss
Attorney, Agent, or Firm—William R. Price

[57] ABSTRACT

A device is described suitable for harvesting peppers and other vegetables which grow on short bushes or vines close to the ground. Thus, a pepper picker sits on the seat in close proximity to the plants, while the device is in straddle position relative to the row. The pickers then are able to select the ripe fruits from the bush leaving the half-ripe or green fruit to mature further. A pair of belt conveyors are diagonally disposed with the inlet portion directly in front of the seat to a discharge portion near the top for discharge into a receptacle. Due to the extremely low profile of the device, the center of gravity is low so that the device can be used in rocky and hilly terrain. Further, through the means of the lift on the tractor, the device can be raised or lowered, depending upon the height of the plants, fulcruming around the axle of the wheel in the extreme rear of the device. Thus, the device can be lowered or raised so as to compensate for lower or taller plants. Because of the small size, the low profile and the extreme maneuverability of the device, the peppers or other fruits can be harvested with essentially no damage to the crop.

10 Claims, 6 Drawing Figures

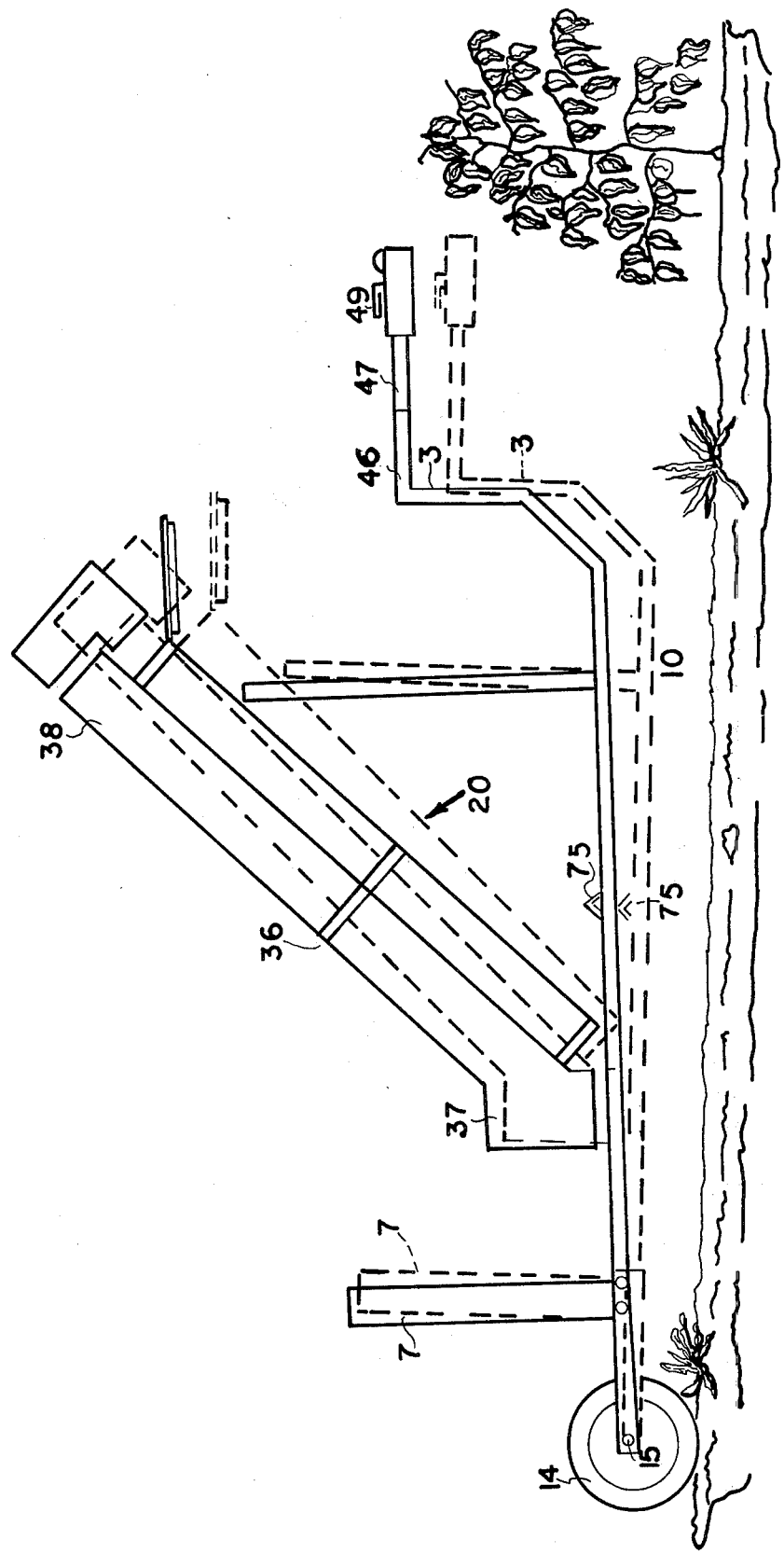

PEPPER HARVESTING APPARATUS

FIELD OF THE INVENTION

The present invention relates to a pepper harvester and more particularly to an apparatus for facilitating the picking of peppers or other fruit growing on short bushes without damage to the crop.

DESCRIPTION OF THE PRIOR ART

Insofar as applicants are aware, no devices have been proposed for harvesting peppers until recently. Recently, however, D. G. Walker & Sons of Olive, North Carolina, have proposed a self-propelled device for the harvesting of many vegetables such as cucumbers, tomatoes, squash, strawberries and peppers. Several devices have been proposed, however, for the harvesting of cotton and for the harvesting of tomatoes and particularly for the harvesting of tobacco. Thus, for example, Stark in 1918 patented a device in U.S. Pat. No. 1,275,781 for the harvesting of tobacco. This device was quite large and was self-propelled. It contained some low lying seats, for the pickers and was quite large and bulky, but suitable for the flat bottom lands on which tobacco was grown. Tarkington, in U.S. Pat. No. 1,504,846 proposed a tomato harvester having a pair of laterally disposed beams and a set of sling supported seats, for the provision of pickers who could move laterally of the device for picking the fruit. The tomatoes were then deposited onto a conveyor mechanism which conveyed the picked fruit to the wagon drawn by horses in the front. The tobacco harvesters, on the other hand, such as those disclosed by W. E. Davis, et al in U.S. Pat. No. 2,786,585 consisted of a driving mechanism and seats for two pickers, seated low to the ground who could select leaves from the tobacco plants and place them onto a conveying mechanism whereby they could be conveyed to tobacco sticks suspended across the width of the top of the device. Another harvesting apparatus proposed by Kelly Dilday et al, U.S. Pat. No. 3,664,526, comprised a movable trailer attached to a tractor of the device whereby the pickers seated on seats could select certain leaves of tobacco to be conveyed upwardly and then placed on the tobacco sticks located in the front portion of the trailer. The Dilday device required that the tobacco plants be planted in wide rows (two plants wide) for accomodation of the harvesting apparatus and a wide "middle" or "balk" through which the harvester could be driven.

Honeycutt, in 1974, patented in U.S. Pat. No. 3,827,446, a veritable factory for picking fruit, conveying it to work tables where the fruit was sorted and packed by persons seated adjacent the conveying apparatus on the inside of the trailer.

Again, Long, in U.S. Pat. No. 4,026,431 proposed a tobacco picker, useful for "priming" tobacco which consisted of two low slung seats positioned on a tractor and a series of conveyors for moving leaves selected to the proper position for suspension onto sticks alined across the top of the apparatus.

Finally, Honeycutt again in his U.S. Pat. No. 3,066,176 proposed a large tobacco picking apparatus containing a plurality of conveying systems, sticks for suspending the tobacco leaves, etc.

BACKGROUND OF THE INVENTION

Insofar as applicants are aware, no apparatus suitable for the harvesting of peppers and particularly pimento peppers, has been presently proposed. A peculiarity of the pimento peppers is the fact that they favor relatively rocky and hilly terrain. Previously, these peppers have been cultivated primarily in the hillier portions of the south. Only recently have they been introduced as a major crop in the knob and hilly regions of Kentucky. However, because of the rocky and rather hilly terrain, the pepper plants grow beautifully in this soil. The fields, however, are relatively small, located in hilly terrain and the large apparatus admirably suited for picking tobacco plants in the flat fields of North Carolina and South Carolina are not practical in the small rocky fields of Kentucky. Further, large apparatus, such as that proposed by Dilday, which even in the flat fields of the Carolinas require a special planting of the tobacco plants, are so large and so cumbersome that their use would destroy the major portion of the crop of the small fields found in hilly terrain.

SUMMARY OF THE INVENTION

According to this invention, therefore, there is provided a small, economical device which is extremely maneuverable and which has a low center of gravity suitable for travel over rock and hilly terrain. Additionally, there is provided a device having two low slung frame members running longitudinally of the device connected to three yoke members, each having transverse members at the top spanning the width of the device and leaving the middle absolutely open. By the provision of two rearwardly extending bifurcated forks, in which the wheels are journaled, the device can be raised or lowered fulcruming around the axles of the rearwardly disposed wheels, while maintaining the stability and the low center of gravity of the device but allowing the transverse members of the yoke to be raised or lowered according to the height of the plants to be harvested. The raising and lowering of the device is simply accomplished by means of a hitch attachment connected to a projecting tongue from the front yoke onto a lift of a conventional tractor. Thus, there is essentially no limit beyond which the front of the tractor can be raised.

Two seats, located adjacent the vertical frame members of the rear yoke, are situated for the provision of pickers at a height of from 8 to 10 inches from the ground. Two belt conveyors arranged with their inlets directly in front of the pickers, and with the discharge end extending past the intermediate yoke, collect the fruit deposited onto the conveyors by the pickers and convey it to the top of the conveyor and into a receptacle such as a hanging bag or the like at the front thereof.

The conveyors can be driven by a drive means such as a standard gasoline motor, having a throttle operated by one of the pickers, so that the conveyor can run at the speed selected by them. Chute members having walls extending the length of the upper flight of the conveyor extend forwardly of the discharge end of the conveyor and contain a deflecting hood in the form of a piece of heavy rubber bent around the edge of the extending chute member walls which will then deflect the fruit into a receptacle suspended from a bracket attached to the end of the conveyor assembly. A platform or box, situated at the bottom of the receptacle, may be used to support the bag or other receptacle and can be spring loaded or the like to prevent bruising of the fruit as it falls into the bag during the traverse of the harvester along the length of the row. The device, with the three transverse members of the three yokes spanning the row in straddle position with a seat for a picker mounted on the low slung frames on each side allows the pickers to quickly and selectively pick only the ripened fruit and deposit it onto the belt conveyors to be conveyed to the top and into the awaiting receptacle.

BRIEF DESCRIPTION OF THE DRAWINGS

FIG. 5 is a side elevation in full and phantom lines showing in full lines the device raised by the lift of the tractor to compensate for taller plants.

DESCRIPTION OF THE PREFERRED EMBODIMENT

Figure 1:
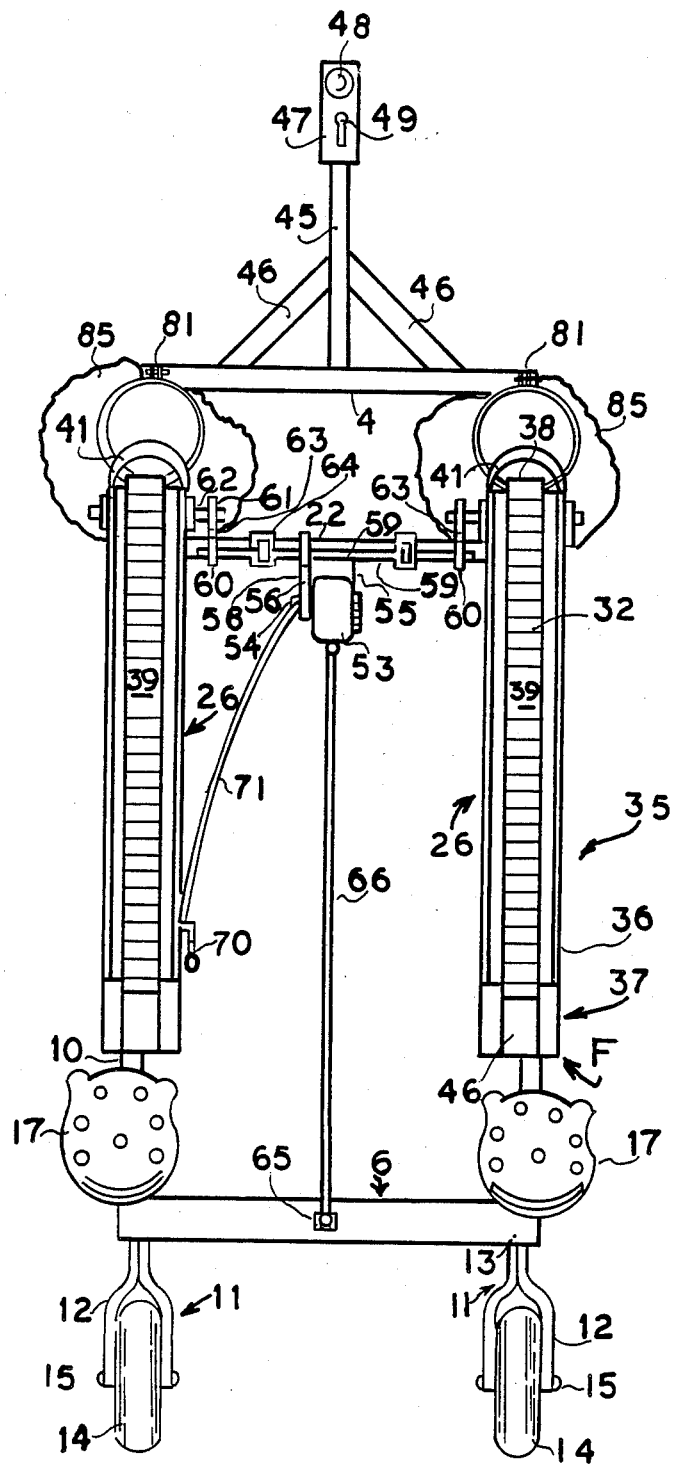
FIG. 1 is a plan view of the pepper harvester of this invention.
Figure 2:
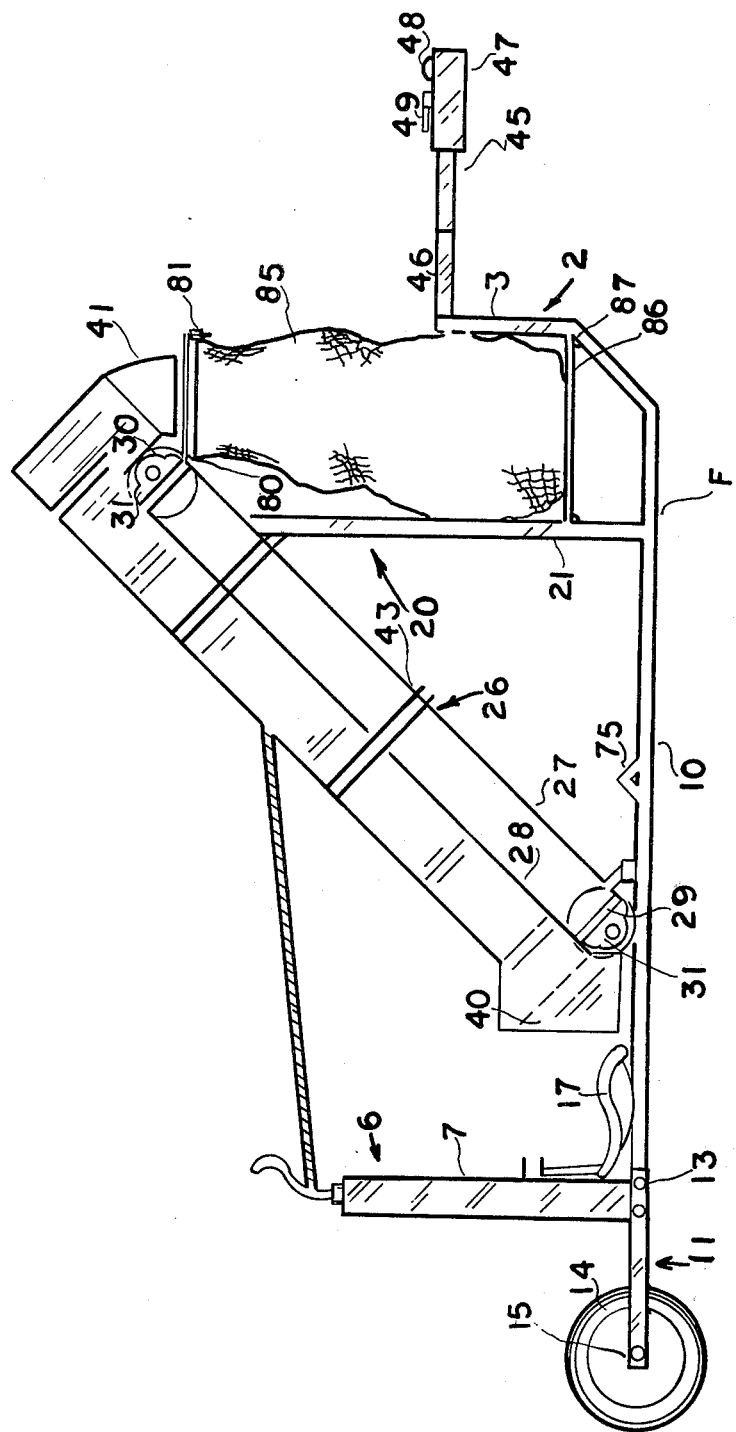
FIG. 2 is a side elevation of the device of this invention.
Figure 4:
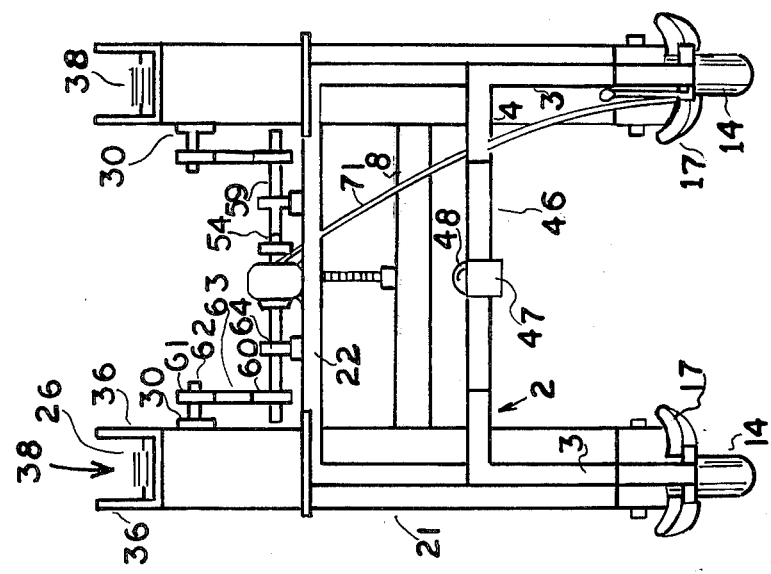
FIG. 4 is an elevational view from the front of the pepper harvester of this invention.
Figure 3:
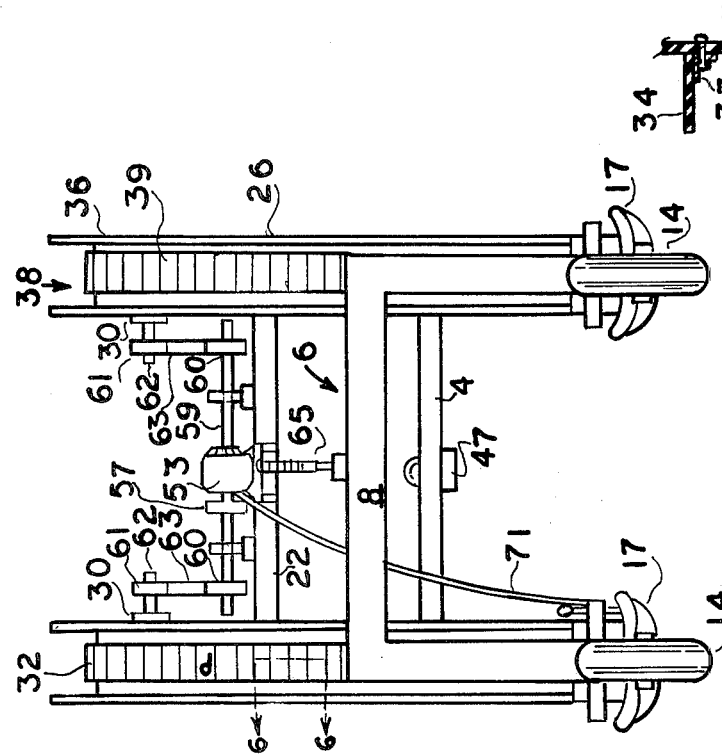
FIG. 3 is an elevational view from the rear of the device of this invention.
Figure 6:
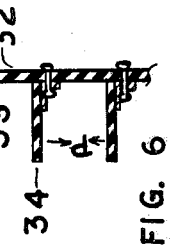
FIG. 6 is a sectional view taken along lines 6—6 of FIG. 3 illustrating only the top flight of a portion of the top conveyor.

Referring now to the drawings, in particular to FIGS. 1 and 2, the device of this invention consists of a frame F, having mounted thereon a front yoke 2, a rear yoke 6, and an intermediate yoke 20. Each of these yokes are anchored at the bottom to the two side frame members 10, extending longitudinally the length of the device. The front yoke 2, has two vertically disposed members 3 and a transverse member 4. The rear yoke 6 has two vertically disposed members 7 anchored again to side frame members 10 and a transverse member 8 which spans the width of the apparatus. At the rear of the device, there is a bifurcated fork member 11 having two legs 12. The fork member is attached to the rear of frame member 10 at point 13 by bolts or the like. A pair of wheels 14 are journaled within the legs 12 of the fork members. Axle 15, extends through the two legs 12, through bearings (not shown) to support the wheel. Immediately in front of the rear yoke member are a pair of seats 17 which may or may not contain a back rest at about the position of the shoulders. There is also a foot rest 75, extending forwardly on the longitudinal frame members 10. The intermediate yoke member 20 also contains two vertically disposed frame members 21 again attached to the longitudinal side frame members 10 at the bottom and a transverse member 22 extending across the width of the device. A conveyor assembly 26 is mounted at the bottom to the longitudinal frame members 10 by brackets and at the top to the transverse member 22 of the intermediate yoke 20. The conveyor assembly 26 consists of lower slider plate 27 and upper slider plate 28. An idler pulley 29 is journaled in bearing plate 31 and a drive pulley 30 is journaled in bearing plate 31 at the top or discharge end of the conveyor. A chute 35 containing chute walls 36 extends the length of the conveyor and at the discharge end 38 extends out past the end of the conveyor 26. An endless belt 32, fabricated of rubber, and having transverse ribs extending across the face of the belt 32, is trained over the idler pulley 29 and the drive pulley 30. A short angle iron 33 is pop riveted transversely across the belt 32 adjacent each rib and a rectangular rubber piece is secured as by cementing or pop riveting to the vertical leg of said angle iron. The pockets P thus formed between adjacent rubber flippers 34 act as recesses to receive and carry the fruit upwardly along the conveyor belt 32. The drive pulley 30, of course has an adjustment means (not shown) for adjusting the tension on the belt. At the inlet end 37 of chute 35 there is a slanting floor 40 which feeds onto the conveyor belt 32, so that articles dropped into the chute will automatically roll into the pockets P formed by the rubber flippers 34 on the conveyor and be carried up to the top. Attached to the ends of the chute walls 36 at the discharge end 38 is a deflector hood 41 fabricated of rubber or the like fastened to U shaped bracket 43 at the end of the chute 35 to deflect the peppers into a receptacle 85. The walls 36 of the chute 35 are held into position by means of U shaped brackets 43 mounted under the lower slider plate 27 and extending upwardly to engage the two side walls 36 of the chute. At the front of the device is a projecting tongue 45 and reinforcing struts 46 for provision of a hitch assembly 47. The hitch is by means of a ball socket 48 and an adjustment handle 49 for tightening the hitch into position.

While it is possible to drive the conveyor belt by a series of gears attached to a wheel running along the ground, in the embodiment shown, the driving means consists of a motor 53 mounted on motor mounts 55. The motor 53 contains a stub shaft 54 having a drive sheave 56. The drive sheave 56 cooperates with the sheave 57 on shaft 59 by means of V belt 58. Thus, the shaft 59 journaled in bearings 64 is driven by the belt 58. The sheaves 60 at each end of the shaft 59 are connected to the sheave 61 of the pulley shaft 62 by means of V belts 63. The motor 53 has a clutch, which can be operated by clutch handle 65 attached to the transverse member 8 of the rear yoke and which operates line 66 going to the clutch of the motor (not shown). Additionally, the motor has a throttle which can be operated by throttle handle 70 through line 71 located at hand level on the side of the conveyor assembly 26. Bracket 80 connected to bracket 43 at the discharge end of conveyor 26 contains a clamp 81 for securely fastening the receptacle such as a burlap or grass bag 85 thereto.

OPERATION

As previously mentioned, pimento peppers are grown primarily in relatively rocky and hilly ground. The device of this invention has a low center of gravity, which fulcrums around the rear axle 15 of the rear wheel 14. By means of the three yokes, i.e., the front yoke 2, the rear yoke 6 and the intermediate yoke 22, the middle of the apparatus is completely open so as to allow the pepper plants or other vegetables to be picked without contact with the harvesting apparatus. Thus, the pickers, seated in the seats 17 at almost the rear of the device, can select the red peppers, leaving the green peppers for further ripening. The pickers then deposit the ripe fruit into the inlet end 37 of chute 35. Thereafter, the peppers roll along inclined floor 40 onto the endless belt 32 and into the pocket P formed by angle irons 33 and rectangular rubber pieces 34 attached to belt 32 of the conveyor 26 and are conveyed upwardly to the discharge end 38 and are deflected by the deflector hood 41 to fall into the burlap bag 85 suspended below from the bracket member 80. The speed of the conveyor member can be varied by operation of the handle 70 of the throttle or the motor can be completely disconnected from the drive through the manipulation of the clutch handle 65.

Because of the structure of the apparatus with the longitudinal frame members lying so close to the ground, the center of gravity of the apparatus is extremely low. In hilly ground there is little danger of the apparatus turning over. Further, as the plants vary in size, the apparatus can be lifted, as shown in FIG. 5, through the hitch of the tractor, so that taller plants are not crushed or bent over by the apparatus.

The speed of the conveyors, of course, can be varied by the operators sitting on the seats 17 depending upon the fullness of the crop. Further, the speed of the conveyor belt 32 itself can be completely controlled by the operators. The device is adapted for sharp manuevering, on rocky and hilly terrain, without any appreciable danger of overturning and with minimal damage to the growing plants.

Many modifications will occur to those skilled in the art from the detailed description hereinabove given. Such description is meant to be exemplary in nature and non-limiting except so as to be commensurate in scope with the appended claims.

We claim:

1. A pepper harvester, adapted for axial movement astraddle a row of pepper plants, which comprises:
   A. a frame comprising:
   1. a front yoke and a rear yoke, each yoke having two vertically disposed members and one transverse member;
   2. a pair of longitudinally disposed side frame members, each of said longitudinally disposed side frame members attached to the lower end of one of said vertically disposed members of said front and rear yokes;
   3. a bifurcated fork member attached to the end of each of said longitudinally disposed side frame members and extending rearwardly of said rear yoke;
   4. a pair of wheels, each wheel being journaled in one of said bifurcated fork member;
   5. seats mounted on each of said longitudinally disposed side frame members immediately in front of the vertically disposed support members of said rear yoke;
   6. a hitch member projecting forwardly from the upper part of said first yoke for operative attachment with the hitch of a tractor;
   B. a conveyor assembly mounted on each of said longitudinally disposed side frame members and diagonally disposed upwardly along the longitudinal axis of said longitudinally disposed side frame members, each of said conveyor assemblies comprising:
   1. a drive pulley;
   2. an idler pulley;
   3. an endless belt trained over said drive pulley and said idler pulley and forming an upper flight and a lower flight;
   4. drive means for driving said drive pulley;
   C. a chute member in operative relation with said upper flight of said conveyor, and extending from the proximity of said seat upwardly toward the front of said frame and having a loading end and a discharge end; and
   D. a receptacle in operative relation with the discharge end of said chute.

2. A pepper harvester, as defined in claim 1, the further combination therewith of a foot rest mounted on each of said longitudinally disposed side frame members.

3. A pepper harvester, as defined in claim 1, the further combination therewith of a third yoke located intermediate of said front and rear yokes and comprising:
   A. two vertically disposed frame members, each anchored at the bottom to one of said longitudinally disposed side frame members and;
   B. a transverse member spanning said frame and operatively connected at the top of said vertically disposed frame members.

4. A pepper harvester, as defined in claim 3, the further combination with said conveyor assembly of:
   A. upper and lower slider plates extending the length of said conveyor assembly;
   B. bearing plates attached at each end of said assembly and containing bearings for journaling the shaft of said drive pulley and said idler pulley.

5. A pepper harvester, as defined in claim 4, in which said drive means comprises:
   A. a motor mounted on the transverse member of said intermediate yoke;
   B. a first drive shaft driven by said motor;
   C. a set of bearings mounted on said transverse member of said intermediate yoke in which said first shaft is journaled;
   D. a drive sheave on each end of said first drive shaft;
   E. a pair of driven shafts for the drive pulley of said belt conveyor, each of said driven shafts having a driven sheave in operative relation with a drive sheave of said first drive shaft;
   F. a V belt linking a drive sheave on each end of said first drive shaft to the driven sheaves of each of the driven shafts of said drive pulley.

6. A pepper harvester, as defined in claim 4, the further combination with said upper and lower slider plates comprising U-shaped bracket members, extending upwardly for attachment to the walls of said chute.

7. A pepper harvester, as defined in claim 3, the further combination of a bracket fastened near the top of said chute for supporting said receptacle.

8. A pepper harvester, as defined in claim 5, having a control located on the transverse member of said rear yoke, with said motor.

9. A pepper harvester, as defined in claim 5, in which said motor includes a throttle member mounted at hand level on said frame for operation by one of the operators.

10. A pepper harvester, as defined in claim 1, the combination of a deflecting hood, mounted on the discharge end of said chute for deflecting peppers into said receptacle.

* * * * *